United States Patent
Eisenbraun

(10) Patent No.: US 6,463,686 B1
(45) Date of Patent: Oct. 15, 2002

(54) COVER FOR HITCH RECEIVER

(75) Inventor: Kenneth D. Eisenbraun, Troy, MI (US)

(73) Assignee: United Global Sourcing, Inc., Troy, MI (US)

( * ) Notice: Subject to any disclaimer, the term of this patent is extended or adjusted under 35 U.S.C. 154(b) by 0 days.

(21) Appl. No.: 09/712,992

(22) Filed: Nov. 15, 2000

Related U.S. Application Data

(60) Provisional application No. 60/165,534, filed on Nov. 15, 1999.

(51) Int. Cl.[7] .............................. B60D 7/00; B60D 1/00
(52) U.S. Cl. ......................................... 40/591; 280/507
(58) Field of Search ............................ 40/591; 280/507, 280/504; D12/162

(56) References Cited

U.S. PATENT DOCUMENTS

| | | | |
|---|---|---|---|
| 4,040,641 A | 8/1977 | Reicke | 280/507 |
| 4,852,902 A | 8/1989 | Young et al. | 280/507 |
| 5,603,178 A | 2/1997 | Morrison | 40/591 |
| D399,805 S | 10/1998 | Donalies | D12/162 |
| D401,194 S | 11/1998 | Harwood | D12/162 |
| D405,744 S | 2/1999 | Young et al. | D12/162 |
| D415,457 S | 10/1999 | Young et al. | D12/162 |
| 6,007,033 A * | 12/1999 | Casson et al. | 248/224.7 |
| D419,505 S | 1/2000 | Deerman | D12/162 |
| 6,053,627 A * | 4/2000 | Vo et al. | 362/485 |
| D424,485 S | 5/2000 | Parker | D12/162 |
| D424,991 S | 5/2000 | Young et al. | D12/162 |
| 6,079,136 A * | 6/2000 | Kozlarek | 40/591 |
| 6,095,546 A | 8/2000 | Austin | 280/507 |

* cited by examiner

*Primary Examiner*—Cassandra Davis
(74) *Attorney, Agent, or Firm*—Gifford, Krass, Groh, Sprinkle, Anderson & Citkowski, P.C.

(57) ABSTRACT

A hitch receiver cover system is used with a hitch receiver of the type having a receiving opening. The cover system includes a decorative cover and a mount with a tube portion for insertion into the receiving opening in the hitch receiver. The tube portion has a cross section smaller than the receiving opening. The mount also has an attaching portion interconnected with the tube portion. At least one connector is provided for selectively interconnecting the cover with the attaching portion.

8 Claims, 2 Drawing Sheets

COVER FOR HITCH RECEIVER

REFERENCE TO RELATED APPLICATION

This application claims priority from U.S. provisional patent application Ser. No. 60/165,534, filed Nov. 15, 1999, the entire contents of which are incorporated herein by reference.

FIELD OF THE INVENTION

The present invention relates generally to towing hitches and, more specifically, to a cover for hitch receivers including adapter tubes allowing use with either large or small receivers.

BACKGROUND OF THE INVENTION

Many vehicles have hitches installed for such uses as towing trailers. Typical hitches fit under the rear bumper of the vehicle and include a main portion which attaches to the vehicle frame or structure. This main portion has a rearwardly extending square tube, generally called a receiver. A square cross section hitch adapter slides into the receiver and includes a ball for attaching a trailer thereto. Often, owners of vehicles with hitches remove the adapter and ball portion when not using the vehicle for trailering. One reason for removing the adapter and ball is to avoid it being stolen out of the receiver. Also, when the adapter and ball are installed into the receiver, they extend beyond the rear bumper of the car. Therefore, by removing the receiver and ball when not in use, damage that may be caused by or to the adapter and ball are avoided.

With the adapter and ball removed from the receiver portion of the hitch, the vehicle is left with a rearward facing square opening located just below the rear bumper. There are a variety of covers available for this opening to avoid contamination from entering the opening. Some covers also provide aesthetic benefits by improving the appearance of the receiver. One type of hitch cover includes a decorative cover and a sleeve extending perpendicularly from the cover for insertion into the hitch receiver. This type of cover is typically formed as one integral piece, either out of metal or plastic. Its one piece construction makes these covers suitable for use with only one size of hitch receiver. Hitch receivers come in multiple sizes, depending on their application. Also, the construction of this type of cover makes it difficult to package. However, there remains a need for improved hitch receiver covers that provide cosmetic benefits, and overcome some of the shortcomings of the prior art.

SUMMARY OF THE INVENTION

The present invention improves on the prior art by providing a hitch cover wherein the decorative cover portion is selectively interconnectable with a mount. The mount has a tube portion for insertion into the receiving opening. The tube portion has a cross section smaller than the receiving opening in the hitch receiver. The mount also has an attaching portion interconnecting with the tube portion. A connector is provided for selectively interconnecting the cover with the attaching portion of the mount. In some embodiments, a second, differently sized mount is provided, with the first and second mount both interconnecting the with decorative cover using the same mounting holes. By providing two selectively interconnectable mounts, the cover system may be assembled so as to interconnect with hitch receivers of more than one size.

DETAILED DESCRIPTION OF THE PREFERRED EMBODIMENTS

Figure 1:
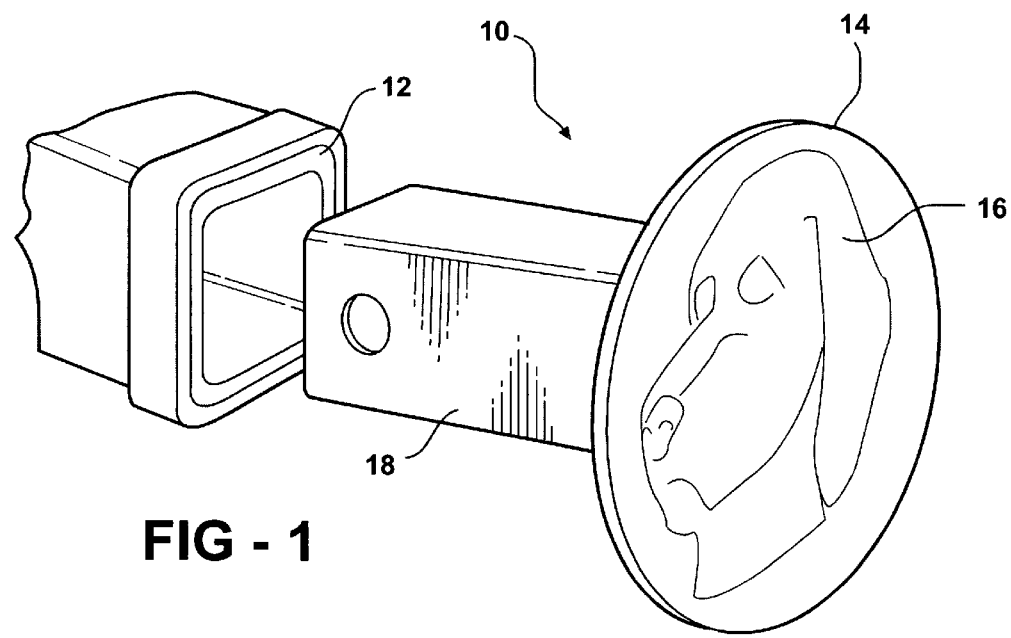
FIG. 1 is a perspective view of a hitch receiver cover system according to the present invention positioned for insertion into a hitch receiver on a vehicle.

Referring first to FIG. 1, a hitch receiver cover system according to the present invention is generally shown at 10 positioned for insertion into a hitch receiver 12. The cover 10 includes a cover portion 14, which may include a decorative display surface 16 with pictures or words thereon, and a tube portion 18 adapted to fit into the receiver 12.

Figure 2:
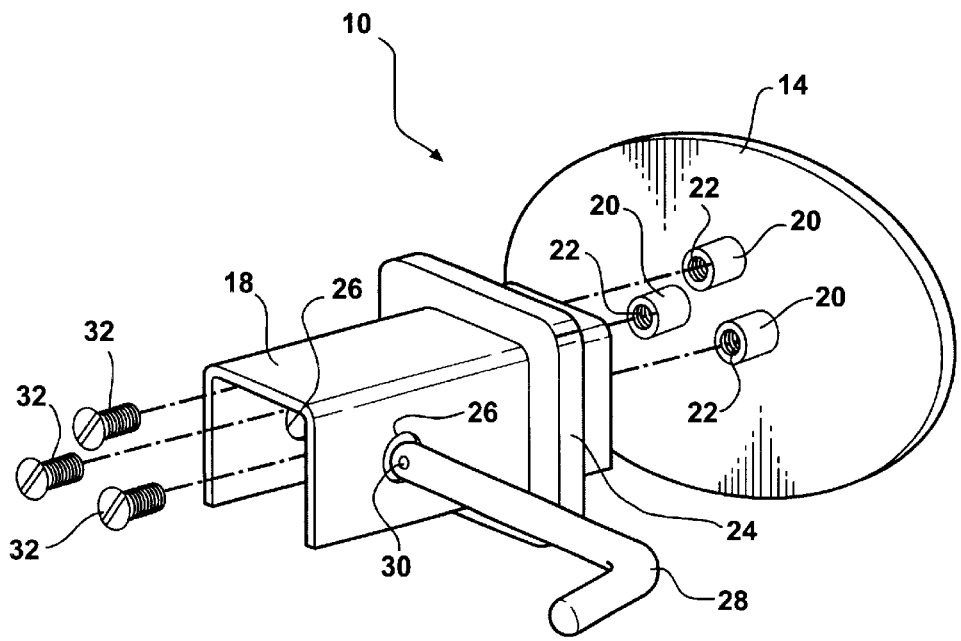
FIG. 2 is an exploded perspective view of the hitch receiver cover of FIG. 1 showing its constituent parts.

The constituent parts of the cover 10 are shown in an exploded view in FIG. 2. As shown, the cover portion 14 has three attachment bosses 20 extending from its back side. Each of the attachment bosses 20 has an attachment hole 22 defined therein. The tube portion 18 is a C-shaped channel of metal sized to fit in the standard receiver. Receivers generally come in two sizes. Large receivers have a side-to-side and top-to-bottom dimension of about 2 inches while small size receivers have a side-to-side and top-to-bottom dimension of about 1¼ inches. The tube 18 shown in FIG. 2 is sized for large size receivers. A foam rubber seal 24 is fitted around the tube portion 18 for helping to seal the end of the receiver when the cover 10 is fitted thereto. This helps to prevent contamination. The tube portion 18 also has a hole 26 defined therethrough. As known to those of skill in the art, receivers, such as 12 in FIG. 1, have a hole defined side to side so that a locking pin may be inserted therethrough to lock the receiver and adapter to one another. Such a locking pin is shown at 28 in FIG. 2. Therefore, once the cover 10 is fitted to a receiver, the locking pin 28 may be inserted through the holes in the receiver and the holes in the tube portion 18, thereby locking the two pieces to one another. As shown, the locking pin 28 has a small hole 30 defined through its end so that a small padlock can be fitted thereto. This prevents easy removal of the cover 10 from the receiver except by those that have a key for the lock. Screws 32 are also shown in FIG. 2 for interconnecting the tube portion 18 and the cover portion 14. Other approaches to interconnecting the tube portion and the cover portion may also be used.

Figure 3:
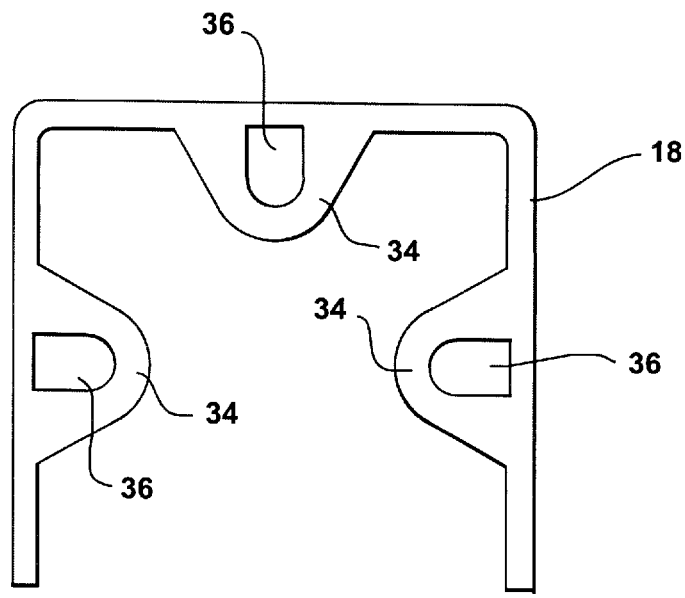
FIG. 3 is an end view of the tube portion of the receiver cover system of FIG. 2 showing the connection tabs.

Referring now to FIG. 3, an end view of the tube portion 18 is shown. This view shows three inwardly extending tabs 34, each with slots 36 defined therein. These tabs 34 and slots 36 are used for interconnecting the attachment bosses 22 of the cover portion 14 to the tube portion 18. That is, the screws 32 pass through the slots 36 and into the holes 22 in the bosses 20. As will be clear to those of skill in the art, the tube portion 18 may be made easily and inexpensively out of a piece of metal bent into a C-shaped cross section. The tabs are bent inwardly from this tube.

Figure 4:
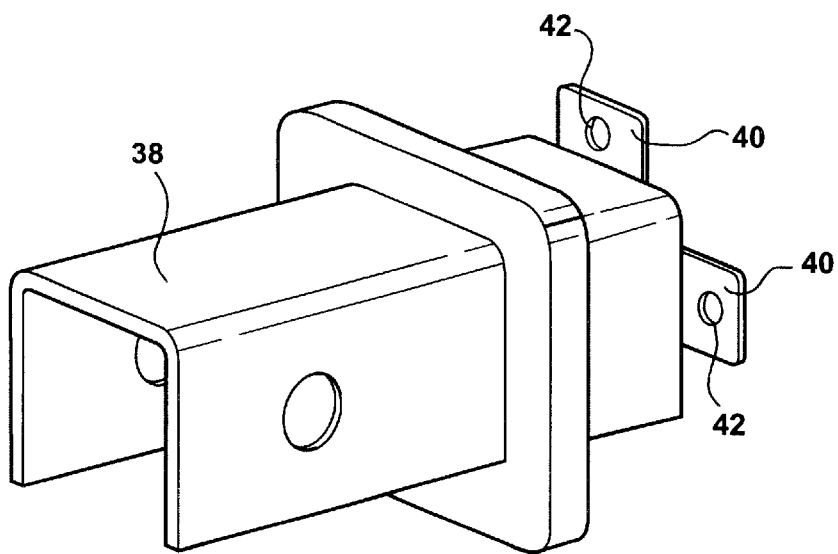
FIG. 4 is a perspective view of a smaller size tube portion for use with the cover system according to the present invention, allowing use with a smaller size receiver.

Referring now to FIG. 4, a tube portion 38 for use with the present invention is shown. This tube portion 38 has smaller dimensions to allow it to fit into a standard small size receiver. Because this tube portion 38 has smaller dimensions than the tube portion 18, it has tabs 40 extending outwardly therefrom for connection to the bosses 20 on the back of the cover portion 14. Only two of these tabs 40 are shown, but a third tab is included on the third side of the tube portion 38. Each of these tabs includes holes 42 for screws to pass through. The tabs on the tube portion 18 and the tabs on the tube portion 38 are positioned such that the holes through each allow connection to the same holes 22 in cover portion 14. This simplifies the provision of a cover 10 that is easily adapted to either large or small receivers.

As will be clear to those of skill in the art, the cover portion 14 may be of various shapes, sizes and designs. As shown, the cover portion 14 is an oval plate with a decorative design of a dog displayed thereon. Obviously, other shapes and sizes and designs may also be used.

In one embodiment of the present invention, the cover portion 14 and the tube portions 18 and 38 are metal, interconnected by screws. Alternatively, the tube portion and/or the cover portion may be molded from plastic or made of other materials. The tube portion and cover portion may also be interconnected in others ways. Also, the tube portion and/or the cover portion may be molded from plastic and interconnected during the molding process or as a separate step. Alternatively, the two pieces may be molded as a single piece. Other changes may also be made to the present invention without departing from its scope, as will be clear to those of skill in the art. It is the following claims, including all equivalents, which define the scope of the present invention.

I claim:

1. A hitch receiver cover system for use with a hitch receiver of the type having a receiving opening, said cover system comprising:

a decorative cover;

a mount having a tube portion for insertion into the receiving opening, the tube portion having a cross section smaller than the receiving opening, the mount further having an attaching portion comprising a plurality of tabs, interconnected with the tube portion and projecting therefrom; and at least one connector for selectively interconnecting the cover with the attaching portion.

2. The hitch receiver cover system according to claim 1, wherein the tube portion of the mount comprises a three sided C-shaped channel and the attaching portion comprises one tab extending from each of the three sides of the channel.

3. The hitch receiver cover system according to claim 2, wherein each of the tabs has a slot defined therethrough and the cover has a decorative front face and a back face with holes defined therein, the slots in the tabs aligning with the holes in the back face, the connector comprising fasteners for interconnecting the tabs with the back face.

4. The hitch receiver cover system according to claim 1, further comprising locking pin, the hitch receiver and the tube portion having corresponding holes for accepting the locking pin.

5. A hitch receiver cover system for use with hitch receivers of the type having a receiving opening, said system comprising in combination:

a decorative cover;

a first mount for use with a hitch receiver of a first size, the first mount having a tube portion for insertion into the receiving opening in the first size hitch receiver, the tube portion having a cross section smaller than the receiving opening in the first size hitch receiver, the first mount further having a first attaching portion interconnected with the tube portion, the first attaching portion comprising a plurality of tabs extending outwardly from the tube portion of the first mount;

a second mount for use with a hitch receiver of a second size larger than the first size, the second mount having a tube portion for insertion into the receiving opening in the second size hitch receiver, the tube portion having a cross section smaller than the receiving opening in the second size hitch receiver and larger than the cross section of the tube portion of the first mount, the second mount further having a second attaching portion interconnected with the tube portion, the second attaching portion comprising a plurality of tabs extending inwardly from the tube portion of the second mount; and a connector for selectively interconnecting the cover with the attaching portion of one of the mounts.

6. The hitch receiver cover system according to claim 5, wherein the decorative cover has a decorative front face and a back face having attaching holes defined therein, the plurality of tabs on the first mount and the second mount each having a slot defined therethrough, the slots in the tabs on the first mount aligning with the holes in the back face of the cover and the slots in the tabs on the second mount aligning with the same holes in the back face of the cover, the connector comprising at least two fasteners for interconnecting the tabs of one of the mounts with the holes in the back of the cover.

7. The hitch receiver cover system according to claim 6, wherein the tube portions of the mounts each comprise a three sided C-shaped channel.

8. The hitch receiver cover system according to claim 7, wherein the tabs on the mounts extend perpendicularly from the sides of the channel.

* * * * *